(12) United States Patent
Shimotsuma et al.

(10) Patent No.: US 10,019,900 B2
(45) Date of Patent: Jul. 10, 2018

(54) COMMUNICATION METHOD AND SERVER FOR RECONFIGURATION OF A DYNAMIC MAP

(71) Applicant: Panasonic Intellectual Property Corporation of America, Torrance, CA (US)

(72) Inventors: Yuta Shimotsuma, Osaka (JP); Eiichi Muramoto, Kanagawa (JP); Takahiro Yoneda, Osaka (JP); Kazunobu Konishi, Osaka (JP); Ryota Ohnishi, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/667,889

(22) Filed: Aug. 3, 2017

(65) Prior Publication Data
US 2018/0047287 A1 Feb. 15, 2018

(30) Foreign Application Priority Data

Aug. 10, 2016 (JP) .................... 2016-157082

(51) Int. Cl.
*G08G 1/09* (2006.01)
*G08G 1/0967* (2006.01)
(52) U.S. Cl.
CPC ............... *G08G 1/096783* (2013.01)
(58) Field of Classification Search
CPC ............................................. G08G 1/096783
(Continued)

(56) References Cited

U.S. PATENT DOCUMENTS 7,277,028 B1 * 10/2007 Janke ............... G08G 1/096716
340/905
9,672,736 B2 * 6/2017 Lovell ...................... G08G 1/04
(Continued)

FOREIGN PATENT DOCUMENTS

JP 2006-115360 4/2006
JP 2008-294740 12/2008

OTHER PUBLICATIONS

The Extended European Search Report dated Dec. 20, 2017 for European Patent Application No. 17183950.9.
(Continued)

*Primary Examiner* — Omar Casillashernandez
(74) *Attorney, Agent, or Firm* — Greenblum & Bernstein, P.L.C.

(57) ABSTRACT

A method used in a server includes configurating a dynamic map by superimposing time-changing information on a road onto a static map based on first data indicative of surrounding information acquired by a first sensor mounted in a roadside unit; computing a first region that is incapable of being observed by the first sensor; receiving a plurality of attribute information items related to respective second sensors mounted in respective vehicles running on the road from the vehicles; selecting a specific second sensor from among the second sensors based on the attribute information items and the first region; receiving specific second data acquired by the specific second sensor among a plurality of pieces of second data acquired by the second sensors; reconfigurating the dynamic map by filling the first region by using the specific second data; and distributing the reconfigurated dynamic map to at least one of the vehicles.

7 Claims, 18 Drawing Sheets

(58) Field of Classification Search
USPC .................. 340/905; 701/450–451, 117–122
See application file for complete search history.

(56) References Cited

U.S. PATENT DOCUMENTS

2012/0242505 A1* 9/2012 Maeda ............. G08G 1/096783
  340/905
2017/0092126 A1* 3/2017 Oshida ............. G08G 1/096791

OTHER PUBLICATIONS

Shooter C et al:"INTERSAFE-2 architecture and specification", Intelligent Computer Communication and Processing, 2009. ICCP 2009. IEEE 5th International Conference on, IEEE, Piscataway, NJ, USA, Aug. 27, 2009 (Aug. 27, 2009), pp. 379-386, XP031545074.

* cited by examiner

FIG. 5

| SENSOR IDENTIFIER | POSITION | VIEW ANGLE | OBSERVATION DISTANCE [m] | OBSERVATION DIRECTION [dec] | DATA SIZE INFORMATION | SENSOR TYPE |
|---|---|---|---|---|---|---|
| Sensor 1 | (x, y, z) | a | b | c | d | kkk |

COMMUNICATION METHOD AND SERVER FOR RECONFIGURATION OF A DYNAMIC MAP

BACKGROUND

1. Technical Field

The present disclosure relates to a communication method and a server. More specifically, the present disclosure relates to a server that configurates a dynamic map by using sensor information collected from a vehicle and a roadside unit and a communication method thereof.

2. Description of the Related Art

In recent years, development of techniques for offering safe driving assistance and achieving automated driving has been advancing. Especially, a dynamic map has been attracting attention as a technical means that allows a driver and a vehicle to grasp dynamic information such as positions of surrounding vehicles, pedestrians, bicycles, and the like and a state of a traffic light. The dynamic map is a map having time-changing information superimposed on a map that does not change over time. More specifically, the dynamic map has, on map data, static information such as buildings, roads, and the like (static map) and dynamic information, superimposed on the static information, such as positions and speeds of surrounding vehicles, pedestrians, and the like acquired from sensors mounted in a vehicle and a roadside unit.

Safe driving of a driver can be assisted by visualizing, for the driver, information on surroundings based on the dynamic map.

Use of the dynamic map allows a vehicle to accurately grasp a surrounding situation that changes from moment to moment because of movement of the vehicle itself and movement of surrounding vehicles, bicycles, and the like. Furthermore, use of the dynamic map allows a vehicle to recognize a surrounding situation in a range that cannot be recognized only by a sensor mounted in this vehicle. For example, use of the dynamic map allows a vehicle that is about to enter a place with poor visibility such as an intersection to grasp positions of vehicles, pedestrians, and the like beforehand. This allows the vehicle to perform control actions such as speed adjustment and steering for safety well in advance in accordance with a surrounding situation, thereby, for example, reducing the number of accidents and achieving efficient traffic.

Various methods have been proposed as a method for collecting and distributing dynamic information used for such a dynamic map (see, for example, Japanese Patent No. 4798383 and Japanese Patent No. 4627171). Japanese Patent No. 4798383 proposes a method for distributing, to a vehicle, sensor information collected by other vehicles and a roadside unit. Japanese Patent No. 4627171 proposes a method in which a vehicle requests an image of a predetermined range from another vehicle, and the vehicle that receives the request cuts out the predetermined image and transfers the image to the requesting vehicle.

However, Japanese Patent No. 4798383 does not consider wasting of a network band between a roadside unit and a vehicle although sensor information can be distributed to the vehicle by using the roadside unit. Therefore, the network band is sometimes wasted and becomes insufficient. Similarly, Japanese Patent No. 4627171 does not consider wasting of a network band between vehicles. Specifically, in Japanese Patent No. 4627171, in which all vehicles request an image of a necessary range, an overall communication volume increases in a case where there are a large number of vehicles. As a result, a network band between vehicles sometimes becomes insufficient.

SUMMARY

One non-limiting and exemplary embodiment provides a communication method and a server that make it possible to prevent shortage of a network band by efficiently collecting data necessary for creation of a dynamic map.

In one general aspect, the techniques disclosed here feature a method used in a server including: receiving, from a roadside unit placed on a road, first data that is acquired by a first sensor mounted in the roadside unit and that is indicative of information on surroundings of the roadside unit; configurating a dynamic map by superimposing time-changing information on the road onto a static map including the road on a basis of the received first data; computing a first region that is incapable of being observed by the first sensor, the first region being included in a region indicated by the dynamic map; receiving a plurality of attribute information items from a respective plurality of vehicles running on the road, the plurality of attribute information items being related to a respective plurality of second sensors mounted in the respective plurality of vehicles; selecting a specific second sensor from among the plurality of second sensors on a basis of the plurality of attribute information items and the first region; receiving specific second data acquired by the specific second sensor among a plurality of pieces of second data acquired by the plurality of second sensors, the plurality of pieces of second data being indicative of information on surroundings of the respective plurality of vehicles; reconfigurating the dynamic map by filling the first region by using the received specific second data; and distributing the reconfigurated dynamic map to at least one of the plurality of vehicles.

According to the present disclosure, it is possible to provide a communication method and a server that make it possible to prevent shortage of a network band by efficiently collecting data necessary for creation of a dynamic map.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates an example of attribute information stored in an attribute information management unit according to Embodiment 1;

DETAILED DESCRIPTION

Figure 1:
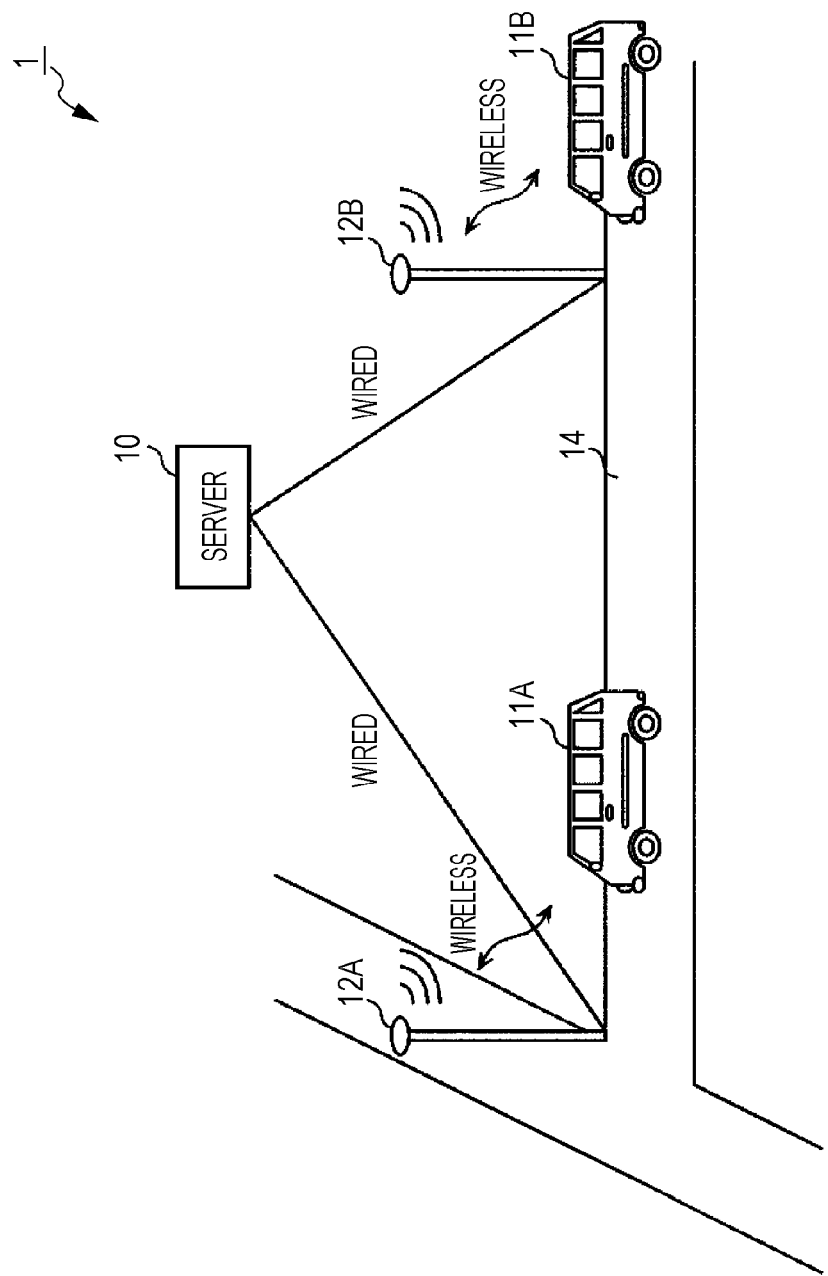
FIG. 1 is a diagram illustrating an example of a configuration of a communication system according to Embodiment 1.

A method according to an aspect of the present disclosure is a method in a server including: receiving, from a roadside unit placed on a road, first data that is acquired by a first sensor mounted in the roadside unit and that is indicative of information on surroundings of the roadside unit; configurating a dynamic map by superimposing time-changing information on the road onto a static map including the road on a basis of the received first data; computing a first region that is incapable of being observed by the first sensor, the first region being included in a region indicated by the dynamic map; receiving a plurality of attribute information items from a respective plurality of vehicles running on the road, the plurality of attribute information items being related to a respective plurality of second sensors mounted in the respective plurality of vehicles; selecting a specific second sensor from among the plurality of second sensors on a basis of the plurality of attribute information items and the first region; receiving specific second data acquired by the specific second sensor among a plurality of pieces of second data acquired by the plurality of second sensors, the plurality of pieces of second data being indicative of information on surroundings of the respective plurality of vehicles; reconfigurating the dynamic map by filling the first region by using the received specific second data; and distributing the reconfigurated dynamic map to at least one of the plurality of vehicles.

This makes it possible to provide a communication method that makes it possible to prevent shortage of a network band by efficiently collecting data necessary for creation of a dynamic map.

The method may be arranged such that each of the plurality of attribute information items includes view angle information indicative of a view angle of a corresponding one of the plurality of second sensors, observation distance information indicative of a distance that is observable by the corresponding one of the plurality of second sensors, positional information indicative of a position of the corresponding one of the plurality of second sensors, and a direction information indicative of a direction of the corresponding one of the plurality of second sensors; and the selecting of the specific second sensor includes: computing second regions that are observable by the plurality of second sensors on a basis of the view angle information, the observation distance information, the positional information, and the direction information, the second regions being included in the region indicated by the dynamic map; and selecting, as the specific second sensor, a second sensor that is largest in an overlapping range between the second region and the first region from among the plurality of second sensors.

The method may be arranged such that each of the plurality of attribute information items includes type information indicative of a type of a corresponding one of the plurality of second sensors; and the selecting of the specific second sensor includes: determining priorities of the respective plurality of second sensors on a basis of the type information; selecting two or more second sensors that have an observation range overlapping the first region from among the plurality of second sensors; and selecting, as the specific second sensor, a second sensor given a highest priority from among the selected two or more second sensors.

The method may be arranged such that each of the plurality of attribute information items includes data size information indicative of a size of a corresponding one of the plurality of pieces of second data; and the selecting of the specific second sensor includes: selecting two or more second sensors that have an observation range overlapping the first region from among the plurality of second sensors; and selecting, as the specific second sensor, a second sensor that is smallest in data size per unit region indicated by the data size information from among the selected two or more second sensors.

The method may be arranged such that the receiving of the specific second data includes: transmitting a request for transmission of the specific second data to a specific vehicle in which the specific second sensor is mounted; and receiving the specific second data from the specific vehicle; and in the transmitting, in a case where a reception rate at which the server receives the specific second data is larger than a threshold value, the request for transmission includes a request to transmit the specific second data after a predetermined period.

The method may be arranged such that the computing of the first region includes: computing a third region that is a region including routes indicated by all pieces of route information of the plurality of vehicles and is a region within a certain distance from the routes on a basis of the route information and positional information of the plurality of vehicles; and updating, as a new first region, a region that overlaps the third region in the first region.

In order to accomplish the above object, a server according to an aspect of the present disclosure is a server including: one or more memories; and circuitry that, in operation, performs operations including: receiving, from a roadside unit placed on a road, first data that is acquired by a first sensor mounted in the roadside unit and that is indicative of information on surroundings of the roadside unit; configurating a dynamic map by superimposing time-changing information on the road onto a static map including the road on a basis of the received first data; computing a first region that is incapable of being observed by the first sensor, the first region being included in a region indicated by the dynamic map; receiving a plurality of attribute information items from a respective plurality of vehicles running on the road, the plurality of attribute information items being related to a respective plurality of second sensors mounted in the respective plurality of vehicles; selecting a specific second sensor from among the plurality of second sensors on a basis of the plurality of attribute information items and the first region; receiving specific second data acquired by the specific second sensor among a plurality of pieces of second data acquired by the plurality of second sensors, the plurality of pieces of second data being indicative of information on surroundings of the respective plurality of vehicles; reconfiguring the dynamic map by filling the first region by using the received specific second data; and distributing the reconfigurated dynamic map to at least one of the plurality of vehicles.

The present disclosure may be realized as a device, as an integrated circuit including a processing unit provided in such a device, as a method including steps performed by the processing unit that constitutes the device, as a program that causes a computer to execute these steps, or as information, data, or a signal indicative of the program. The program information, data, and the signal may be distributed over a recording medium such as a CD-ROM or a communication medium such as the Internet.

Embodiments of the present disclosure are described with reference to the drawings. Each of the embodiments below illustrates a preferable specific example of the present disclosure. Numerical values, shapes, materials, constituent elements, the way in which the constituent elements are disposed and connected, steps, the order of steps, and the like in the embodiments below are examples and do not limit the present disclosure. Among constituent elements in the embodiments below, constituent elements that are not described in independent claims indicating highest concepts are described as optional constituent elements that constitute a more preferable aspect.

Embodiment 1

Configuration of Communication System 1

FIG. 1 is a diagram illustrating an example of a configuration of a communication system 1 according to Embodiment 1.

The communication system 1 illustrated in FIG. 1 includes a server 10, a plurality of in-vehicle units 11A and 11B, and a plurality of roadside units 12A and 12B. Hereinafter, the in-vehicle unit 11A and the in-vehicle unit 11B are referred to simply as in-vehicle units 11 unless the in-vehicle unit 11A and the in-vehicle unit 11B need be distinguished from each other. Hereinafter, the roadside unit 12A and the roadside unit 12B are referred to simply as roadside units 12 unless the roadside unit 12A and the roadside unit 12B need be distinguished from each other.

Each of the in-vehicle units 11 is mounted in a vehicle running on a road 14. The in-vehicle unit 11 is connected to the roadside unit 12 over a wireless local area network (LAN). The roadside unit 12 is placed on the road 14, and is connected to the in-vehicle unit 11 over a wireless LAN and connected to the server 10 over a wired LAN or a wireless LAN. The server 10 is connected to one or more roadside units 12 over a wired LAN or a wireless LAN. Details of configurations and the like of these elements are described below.

Configuration of Roadside Unit 12

Figure 2:
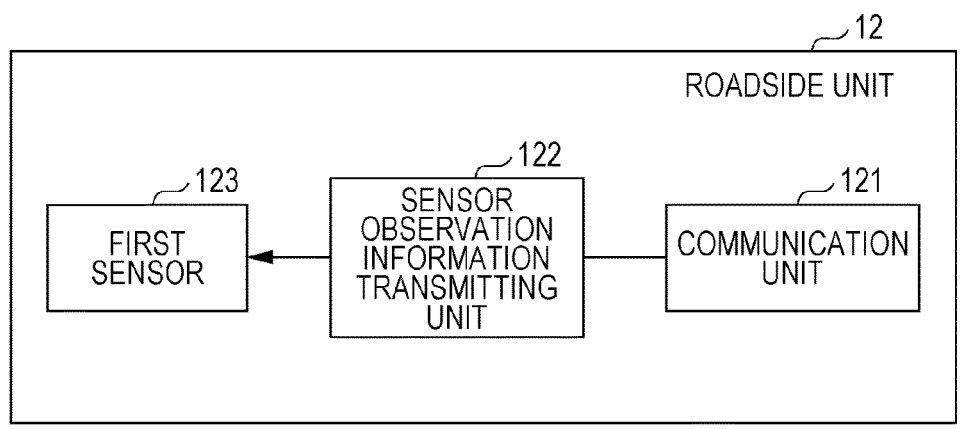
FIG. 2 is a diagram illustrating an example of a functional configuration of a roadside unit according to Embodiment 1.

FIG. 2 is a diagram illustrating an example of a functional configuration of the roadside unit 12 according to Embodiment 1.

The roadside unit 12 is placed on the road 14. For example, the roadside unit 12 is mounted in a utility pole or a traffic light close to the road. The roadside unit 12 illustrated in FIG. 2 includes a communication unit 121, a sensor observation information transmitting unit 122, and a first sensor 123.

Communication Unit 121

The communication unit 121 performs wireless or wired communication. In the present embodiment, the communication unit 121 communicates with the in-vehicle unit 11, for example, over a wireless LAN and communicates with the server 10, for example, over a wires LAN or a wireless LAN.

First Sensor 123

The first sensor 123 mounted in the roadside unit 12 acquires first data indicative of information on surroundings of the roadside unit 12. In the present embodiment, the first sensor 123 has a distance measuring sensor such as a laser range finder or a millimeter-wave sensor and acquires, as first data, an observation value of a distance to an object, a shape of the object, and the like around the roadside unit 12.

The first sensor 123 may further have an imaging device such as a camera or a stereo camera. In this case, the first sensor 123 further detects a traffic light, a sign, and the like on the road 14 and acquires, as first data, information such as the positions and colors of the traffic light and the sign.

Sensor Observation Information Transmitting Unit 122

The sensor observation information transmitting unit 122 acquires first data from the first sensor 123 when the communication unit 121 receives a first data request packet from the server 10. Then, the sensor observation information transmitting unit 122 transmits the first data to the server 10 via the communication unit 121.

Hardware Configuration of Roadside Unit 12

Figure 3:
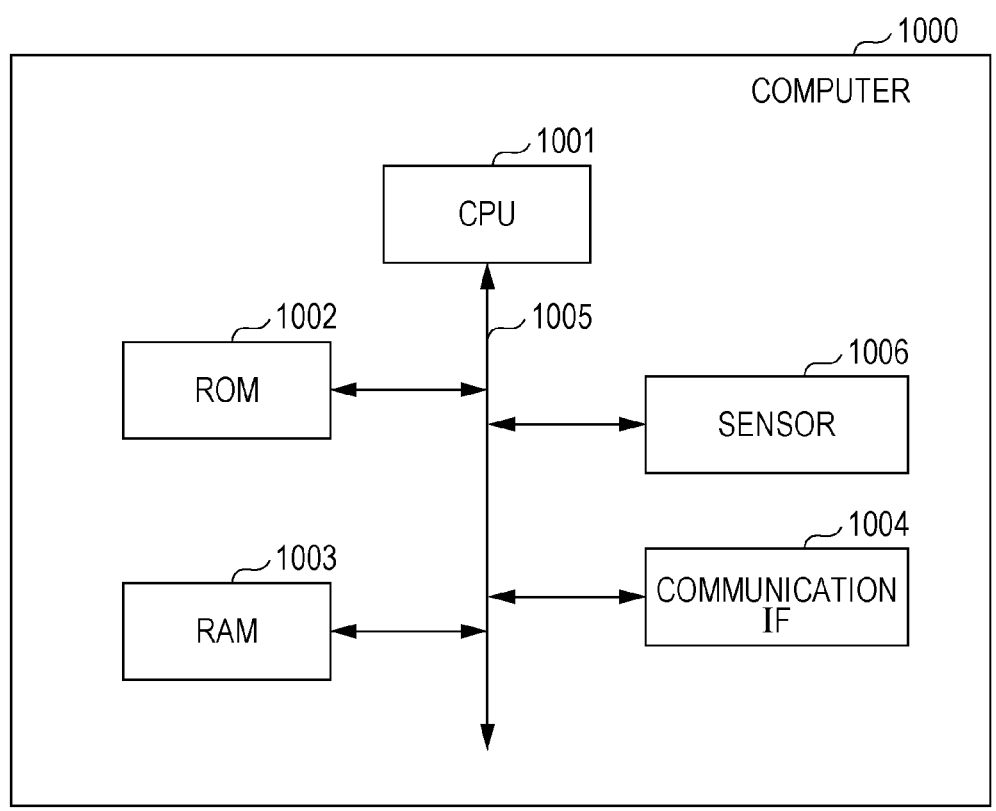
FIG. 3 is a diagram illustrating an example of a hardware configuration of the roadside unit according to Embodiment 1.

FIG. 3 is a diagram illustrating an example of a hardware configuration of the roadside unit 12 according to Embodiment 1.

The roadside unit 12 is realized by a computer 1000. As illustrated in FIG. 3, the computer 1000 includes a CPU 1001, a ROM 1002, a RAM 1003, a communication IF 1004, and a sensor 1006. The CPU 1001, the ROM 1002, the RAM 1003, the communication IF 1004, and the sensor 1006 are connected to one another through a communication bus 1005.

The CPU 1001 is a central processing unit. The CPU 1001 controls, for example, the communication interface 1004 and the sensor 1006 to perform various kinds of processing by executing a control program and the like stored in the ROM 1002.

The ROM 1002 is a read only memory and stores therein a program and data in advance.

The RAM 1003 is a random access memory and is used for storage of data and the like during execution of a program. The RAM 1003 may be a storage such as a hard disc drive or a solid state drive.

The communication IF 1004 is an interface (e.g., a communication circuit) for wireless communication with the in-vehicle unit 11 and for wireless or wired communication with the server 10.

The sensor 1006 is a sensor such as a laser range finder or a millimeter-wave sensor described above and is controlled by the CPU 1001.

Configuration of In-Vehicle Unit 11

Figure 4:
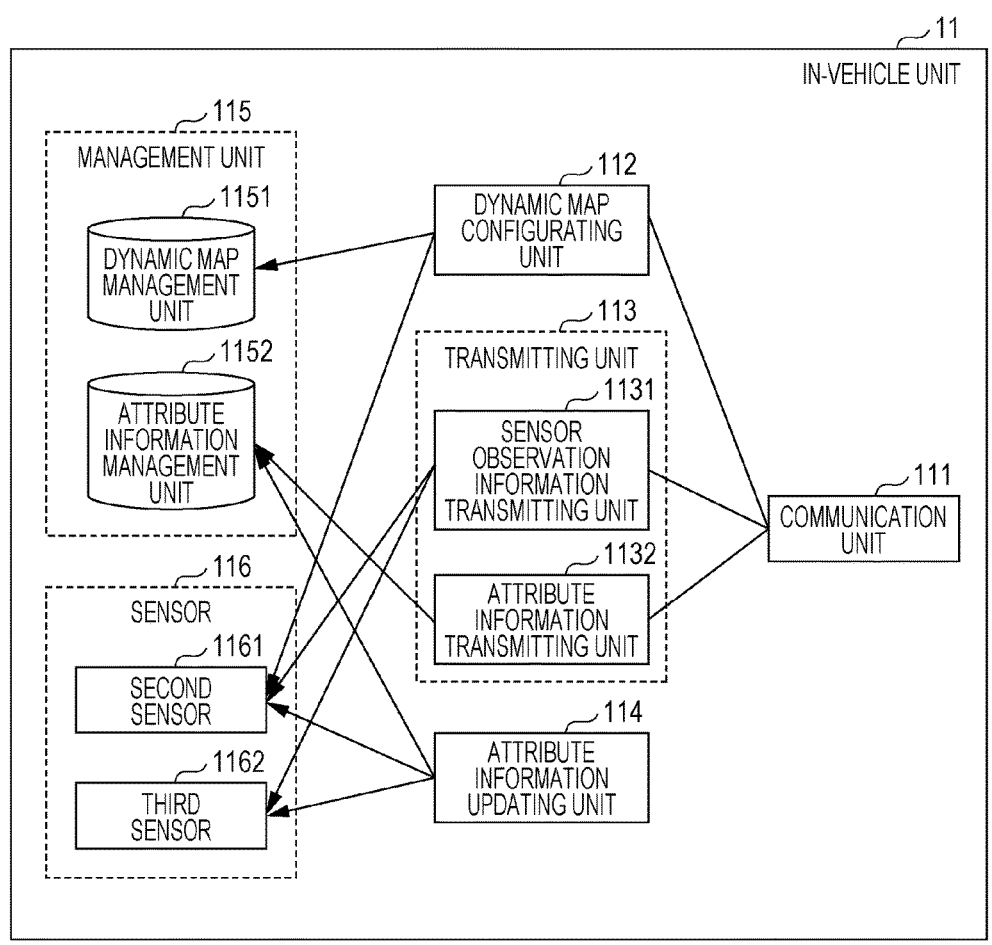
FIG. 4 is a diagram illustrating an example of a functional configuration of an in-vehicle unit according to Embodiment 1.

FIG. 4 is a diagram illustrating an example of a functional configuration of the in-vehicle unit 11 according to Embodiment 1.

The in-vehicle unit 11 is mounted in a vehicle running on a road. The in-vehicle unit 11 illustrated in FIG. 4 includes a communication unit 111, a dynamic map configurating unit 112, a transmitting unit 113, an attribute information updating unit 114, a management unit 115, and a sensor 116.

Communication Unit 111

The communication unit 111 performs wireless communication. In the present embodiment, the communication unit 121 communicates with the roadside unit 12, for example, over a wireless LAN. The communication unit 111 may directly communicates with the server 10, for example, over a wireless LAN.

Sensor 116

The sensor 116 is mounted in a vehicle and includes a second sensor 1161 and a third sensor 1162.

The second sensor 1161 is mounted in a vehicle and acquires second data indicative of information on surroundings of the vehicle such as positions and shapes of pedestrians and other vehicles. In the present embodiment, the second sensor 1161 has a distance measuring sensor such as a laser range finder or a millimeter-wave sensor and acquires, as second data, an observation value of a distance to an object, a shape of the object, and the like around the vehicle at predetermined intervals. The second sensor 1161 may further have an imaging device such as a camera or a stereo camera. In this case, the second sensor 1161 further detects a traffic light, a sign, and the like on the road 14 and acquires information such as the positions and colors of the traffic light and the sign.

The third sensor 1162 has, for example, a global positioning system (GPS) receiver, a speed sensor, and a magnetic sensor and acquires vehicle information that is information on the position, speed, and direction of the vehicle in which the in-vehicle unit 11 is mounted.

Dynamic Map Configurating Unit 112

The dynamic map configurating unit 112 reconfigurates a dynamic map from second data that is an observation value of a distance to an object around the vehicle, a shape of the object, and the like acquired by the second sensor 1161 upon receipt of the dynamic map via the communication unit 111. Then, the dynamic map configurating unit 112 causes the configurated dynamic map to be stored in a dynamic map management unit 1151.

Attribute Information Updating Unit 114

The attribute information updating unit 114 causes attribute information that is information related to the second sensor 1161 to be stored in an attribute information management unit 1152. The attribute information includes, for example, view angle information indicative of a view angle of the second sensor 1161, observation distance information indicative of a distance that can be observed by the second sensor 1161, positional information indicative of the position of the second sensor 1161, direction information indicative of the direction of the second sensor 1161, type information indicative of the type of the second 1161, and data size information indicative of a size of second data acquired by the second sensor 1161. Furthermore, the attribute information includes a position and an observation direction of the second sensor 1161. The attribute information updating unit 114 computes the position and observation direction of the second sensor 1161 from vehicle information acquired by the third sensor 1162 and then causes the position and observation direction of the second sensor 1161 to be stored in the attribute information management unit 1152.

Management Unit 115

The management unit 115 is, for example, realized by a memory such as a RAM or a storage such as a hard disc drive or a solid state drive and includes the dynamic map management unit 1151 that manages a dynamic map and the attribute information management unit 1152 that manages attribute information.

Figure 6:
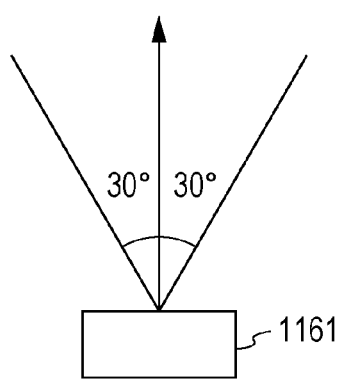
FIG. 6 illustrates an example of a relationship between an observation direction and a view angle illustrated in FIG. 5.

FIG. 5 illustrates an example of attribute information stored in the attribute information management unit 1152 according to Embodiment 1. FIG. 6 illustrates an example of a relationship between an observation direction and a view angle illustrated in FIG. 5.

As illustrated in FIG. 5, the attribute information management unit 1152 stores therein a sensor identifier, a position, a view angle, an observation distance [m], an observation direction [dec], data size information, and a sensor type in association with one another.

The sensor identifier is information for identifying the second sensor 1161. The position is information indicative of the position of the second sensor 1161, for example, an absolute position acquired by a GPS receiver mounted in a vehicle. The observation distance [m] is information indicative of a distance that can be observed by the second sensor 1161. Instead of the observation distance, an observation range that is information indicative of a range that can be observed by the second sensor 1161 may be stored. The observation range or the observation distance [m] may be given in advance or may be found by the attribute information updating unit 114 on the basis of an observation value acquired by the second sensor 1161.

The observation direction [dec] is information indicative of a direction in which the second sensor 1161 faces. For example, the observation direction is an azimuth in which the second sensor 1161 faces, as illustrated in FIG. 6. For example, in a case where the view angle is 30 degrees, the view angle is one with respect to the observation direction. The observation direction may be a relative direction computed on the basis of a traveling direction of a vehicle in which the second sensor 1161 is mounted and a direction in which the second sensor 1161 faces.

The data size information is information indicative of a size of second data. For example, in a case where the second sensor 1161 is a stereo camera, the data size information indicates a data size per frame acquired by the stereo camera, whereas in a case where the second sensor 1161 is a laser range finder, the data size information indicates a data size of distance measurement information that can be acquired by one operation of the laser range finder. The sensor type indicates the type of the second sensor 1161, for example, indicates that the second sensor 1161 is a laser range finder, a stereo camera, or a millimeter-wave sensor.

Transmitting Unit 113

The transmitting unit 113 includes a sensor observation information transmitting unit 1131 and an attribute information transmitting unit 1132.

The sensor observation information transmitting unit 1131 acquires second data from the second sensor 1161 when the communication unit 111 receives a second data request packet from the server 10 via the roadside unit 12. Then, the sensor observation information transmitting unit 1131 transmits the acquired second data to the server 10 via the roadside unit 12.

The attribute information transmitting unit 1132 regularly transmits attribute information to the server 10. In the present embodiment, the attribute information transmitting unit 1132 regularly acquires attribute information from the attribute information management unit 1152. The attribute information transmitting unit 1132 transmits the attribute information to the server 10 by transmitting the acquired attribute information from the communication unit 111 to the roadside unit 12. The frequency of transmission of the attribute information by the attribute information transmitting unit 1132 may be determined by the in-vehicle unit 11 or may be determined by the server 10. For example, in a case where the frequency of transmission of the attribute information by the attribute information transmitting unit 1132 is determined by the server 10, the in-vehicle unit 11 may transmit the attribute information to the server 10 upon receipt of an attribute information request packet that is regularly transmitted from the server 10.

A hardware configuration of the in-vehicle unit 11 according to Embodiment 1 is, for example, realized by the computer 1000 illustrated in FIG. 3 as in the case of the roadside unit 12, and details thereof are identical to those described above and description thereof is omitted.

Configuration of Server 10

Figure 7:
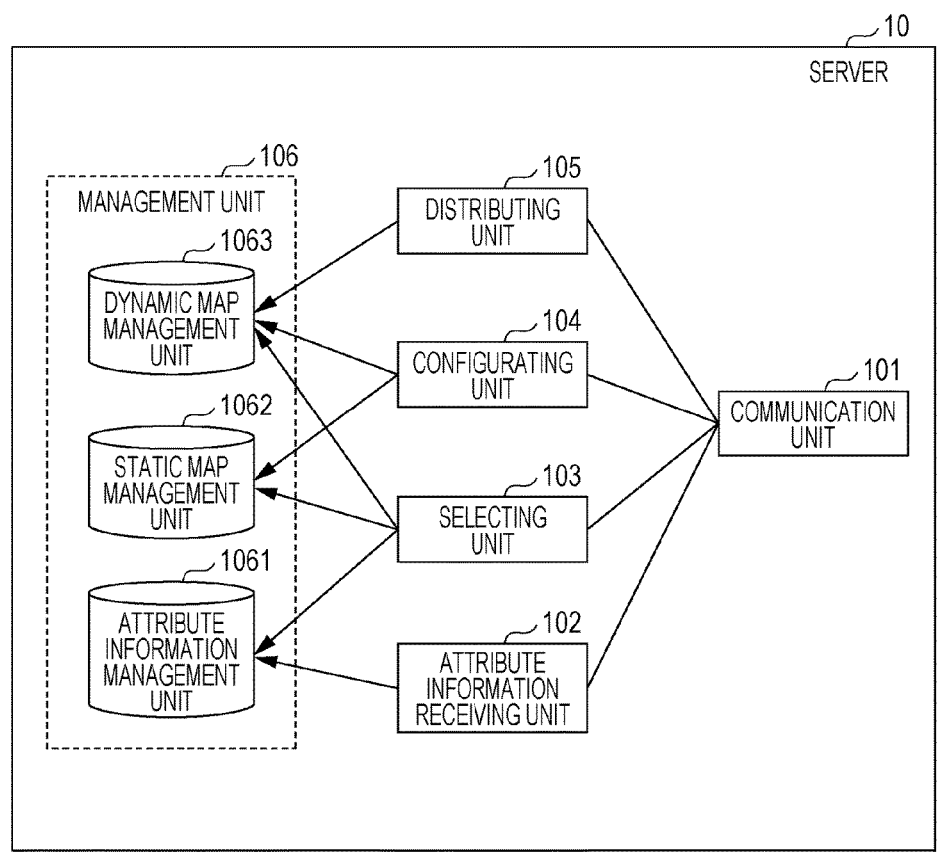
FIG. 7 is a diagram illustrating an example of a functional configuration of a server according to Embodiment 1.

FIG. 7 is a diagram illustrating an example of a functional configuration of the server 10 according to Embodiment 1.

The server 10 illustrated in FIG. 7 includes a communication unit 101, an attribute information receiving unit 102, a selecting unit 103, a configurating unit 104, a distributing unit 105, and a management unit 106.

Communication Unit 101

The communication unit 101 performs wireless or wired communication. In the present embodiment, the communication unit 101 communicates with the roadside unit 12, for example, over a wired LAN or a wireless LAN. The communication unit 101 may directly communicate with the in-vehicle unit 11, for example, via a wireless LAN.

Management Unit 106

The management unit 106 is, for example, realized by a memory such as a RAM or a storage such as a hard disc drive or a solid state drive and includes an attribute information management unit 1061, a static map management unit 1062, and a dynamic map management unit 1063.

The attribute information management unit 1061 stores therein attribute information of the second sensor 1161 acquired from the in-vehicle unit 11 by the attribute information receiving unit 102. More specifically, the attribute information management unit 1061 stores therein attribute information that is received from each of a plurality of vehicles running on a road and that is information related to the second sensor 1161 mounted in the in-vehicle unit 11 of the vehicle.

The static map management unit 1062 stores therein map information of a static map in a range allocated in advance, for example, by an administrator of the server 10. The map information stored in the static map management unit 1062 may include information on objects placed on a road that does not change over time (e.g., the position and type of a traffic light and the position of a roadside unit).

The dynamic map management unit 1063 stores therein a dynamic map obtained by superimposing information that changes over time on the static map configured by the configurating unit 104.

Attribute Information Receiving Unit 102

The attribute information receiving unit 102 receives attribute information, for example, illustrated in FIG. 5 from the in-vehicle unit 11. More specifically, the attribute information receiving unit 102 receives, from each of a plurality of vehicles running on a road, attribute information that is information related to the second sensor 1161 mounted in the in-vehicle unit 11 of the vehicle.

The attribute information receiving unit 102 causes the received attribute information to be stored in the attribute information management unit 1061.

Selecting Unit 103

Figure 8:
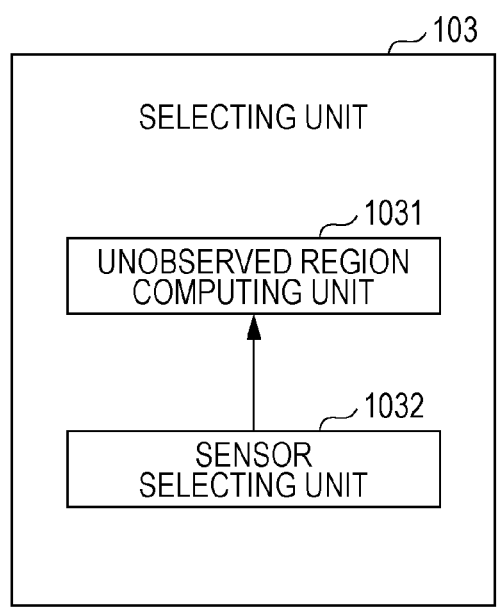
FIG. 8 is a diagram illustrating an example of a detailed configuration of a selecting unit illustrated in FIG. 7.
Figure 9:
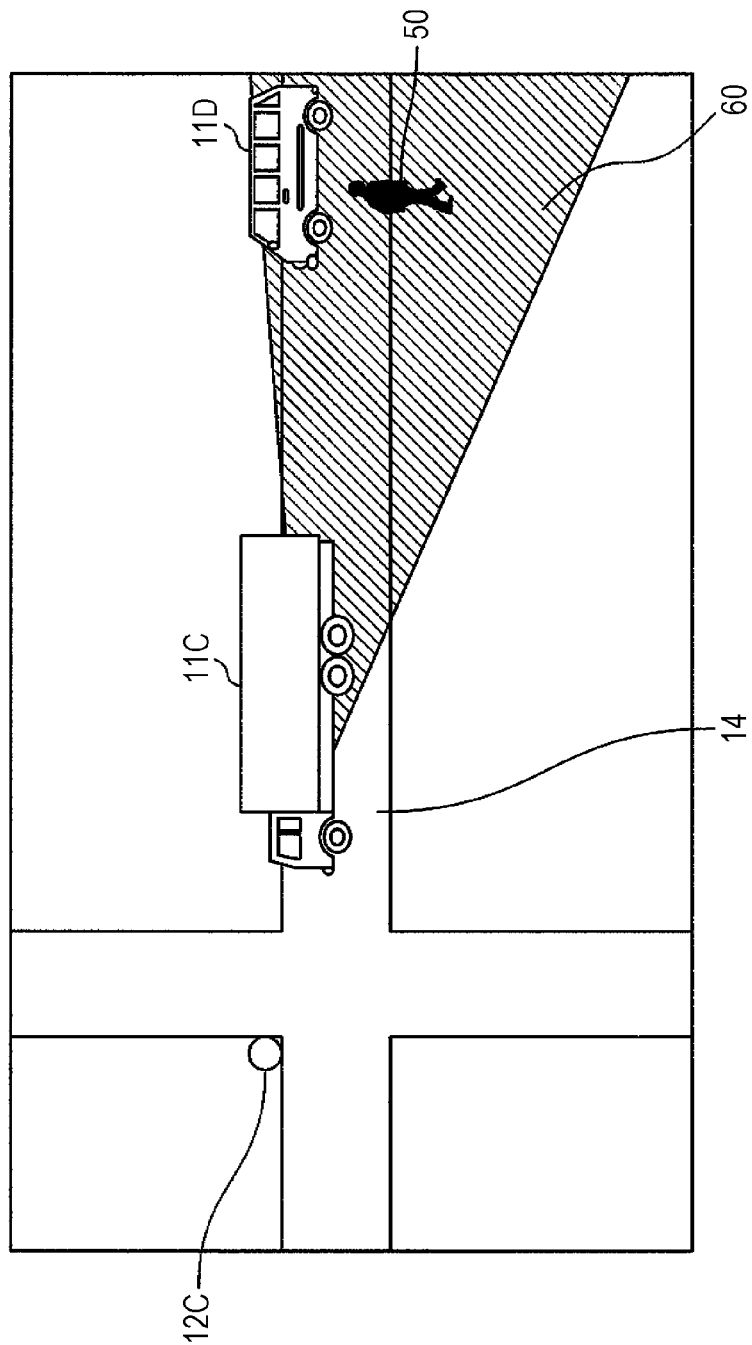
FIG. 9 illustrates an example of an unobserved region computed by an unobserved region computing unit illustrated in FIG. 8.

FIG. 8 is a diagram illustrating an example of a detailed configuration of the selecting unit 103 illustrated in FIG. 7. FIG. 9 illustrates an example of an unobserved region 60 computed by an unobserved region computing unit 1031 illustrated in FIG. 8.

The selecting unit 103 includes the unobserved region computing unit 1031 and a sensor selecting unit 1032 as illustrated in FIG. 8 and selects a specific second sensor 1161 from which second data is to be acquired by performing predetermined processing. Selecting the second sensor 1161 corresponds to selecting the in-vehicle unit 11 in which the second sensor 1161 is mounted. The selecting unit 103 need just select one or more specific second sensors 1161.

The unobserved region computing unit 1031 computes an unobserved region that is included in a region indicated by the dynamic map configurated by the configurating unit 104 and that is incapable of being created from the first data received by the communication unit 101. For example, as illustrated in FIG. 9, the unobserved region 60 is a region that cannot be observed by the first sensor 123 mounted in the roadside unit 12C. Since the unobserved region 60 cannot be created by using the first data acquired by the first sensor 123, for example, the presence of a person 50 is unknown. In the example illustrated in FIG. 9, the unobserved region 60 is a region that is made blind, for example, by a vehicle and cannot be observed by the first sensor 123 mounted in the roadside unit 12C. However, the unobserved region 60 is not limited to this. The unobserved region 60 may further include a region that is out of a range that can be observed by the first sensor 123.

The sensor selecting unit 1032 selects a specific second sensor 1161 from among a plurality of second sensors 1161 on the basis of attribute information that is received from each of a plurality of vehicles running on a road and that is information related to the second sensor 1161 mounted in the vehicle and the unobserved region 60 computed by the unobserved region computing unit 1031. In the example illustrated in FIG. 9, the sensor selecting unit 1032 selects a specific second sensor 1161 that acquires second data that can fill the unobserved region 60.

It is, for example, assumed that the attribute information includes view angle information indicative of a view angle of the second sensor 1161 mounted in the vehicle, observation distance information indicative of a distance that can be observed by the second sensor 1161, positional information indicative of the position of the second sensor 1161, and direction information indicative of a direction of the second sensor 1161. In this case, first, the sensor selecting unit 1032 may compute an observed region that can be created from second data acquired by a plurality of second sensors 1161 mounted in a plurality of vehicles and that is included in a region indicated by a dynamic map configurated by the configurating unit 104 on the basis of the view angle information, the observation distance information, the positional information, and the direction information. Then, the sensor selecting unit 1032 may specify a second sensor 1161 that is largest in a range of overlapping between the computed observed region and the unobserved region computed by the unobserved region computing unit 1031 from among the plurality of second sensors 1161 and select the specified second sensor 1161 as a specific second sensor 1161.

It is, for example, assumed that the attribute information includes type information indicative of the type of the second sensor 1161 mounted in the vehicle. In this case, first, the sensor selecting unit 1032 may determine priorities of the plurality of second sensors 1161 mounted in the plurality of vehicles on the basis of the type information. Next, the sensor selecting unit 1032 may select two or more second sensors 1161 having an observation range overlapping the unobserved region computed by the unobserved region computing unit 1031 from among the plurality of second sensors 1161. Then, the sensor selecting unit 1032 may specify a second sensor 1161 having the highest priority from among the selected two or more second sensors 1161 and select the specified second sensor 1161 as a specific second sensor 1161.

In a case where the second sensors 1161 are, for example, a laser range finder, a millimeter-wave sensor, and a stereo camera, the sensor selecting unit 1032 need just give the highest priority to the laser range finder, give the second highest priority to the millimeter-wave sensor, and give the lowest priority to the stereo camera. The priorities of the second sensors 1161 may be information that is given in advance.

It is, for example, assumed that the attribute information includes data size information indicative of the size of second data acquired by the second sensor 1161 mounted in the vehicle. In this case, first, the sensor selecting unit 1032 may select two or more second sensors 1161 having an observation range overlapping the unobserved region computed by the unobserved region computing unit 1031 from among a plurality of second sensors 1161 mounted in a plurality of vehicles. Then, the sensor selecting unit 1032 may specify a second sensor 1161 that is smallest in a data size per unit region indicated by the data size information from among the selected two or more second sensors 1161 and select the specified second sensor 1161 as a specific second sensor 1161. In this case, first, the sensor selecting unit 1032 acquires attribute information including the position, observation distance, view angle, observation direction, and data size information of the second sensors 1161 included in a selection candidate list. Next, the sensor selecting unit 1032 computes an overlapping portion between each of the observed regions of the second sensors 1161 and the unobserved region on the basis of the acquired attribute information and the unobserved region. Next, the sensor selecting unit 1032 computes a data size per unit region of each of the computed overlapping portions, for example, a data size per unit volume or a data size per unit area on the basis of the overlapping portions and data size information of the second sensors 1161. Next, the sensor selecting unit 1032 need just select a second sensor 1161 that is smallest in data size per unit region of the overlapping portion. This makes it possible to keep a sum of data sizes of all first data and second data collected by the server 10 small.

In this way, the selecting unit 103 selects a specific second sensor 1161 on the basis of the dynamic map stored in the dynamic map management unit 1063 and the attribute information that is acquired from the in-vehicle unit 11 and stored in the attribute information management unit 1061.

Although the selecting unit 103 selects one or more specific second sensors 1161 that can completely fill the unobserved region, the present embodiment is not limited to this. There are cases where there is no in-vehicle unit 11 in which a specific second sensor 1161 needed to completely fill the unobserved region and cases where a period for selection of a specific second sensor 1161 needed to completely fill the unobserved region exceeds a predetermined period. In such cases, the selecting unit 103 may select one or more specific second sensors 1161 that can fill part of the unobserved region while leaving a remaining part of the unobserved region unobserved.

Configurating Unit 104

Figure 10:
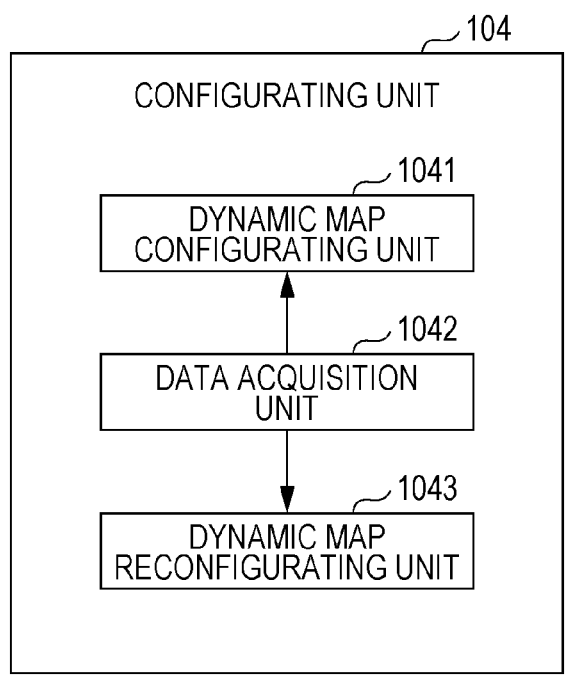
FIG. 10 is a diagram illustrating an example of a detailed configuration of a configurating unit illustrated in FIG. 7.

FIG. 10 is a diagram illustrating an example of a detailed configuration of the configurating unit 104 illustrated in FIG. 7.

As illustrated in FIG. 10, the configurating unit 104 includes a dynamic map configurating unit 1041, a data acquisition unit 1042, and a dynamic map reconfigurating unit 1043.

The data acquisition unit 1042 acquires, from each of a plurality of roadside units 12 placed on the road 14, first data indicative of information on surroundings of the roadside unit 12 acquired by the first sensor 123 mounted in the roadside unit 12. Furthermore, the data acquisition unit 1042 acquires second data that is acquired by the specific second sensor 1161 selected by the selecting unit 103 and that is indicative of information on surroundings of the vehicle in which the specific second sensor 1161 is mounted. In the present embodiment, the data acquisition unit 1042 transmits a first data request packet to the roadside unit 12 via the communication unit 101. Then, the data acquisition unit 1042 acquires first data by receiving, via the communication unit 101, the first data from the roadside unit 12 that receives the first data request packet.

Furthermore, the data acquisition unit 1042 transmits a second data request packet to the in-vehicle unit 11 in which the specific second sensor 1161 selected by the selecting unit 103 is mounted via the communication unit 101. Then, the data acquisition unit 1042 acquires second data by receiving the second data from the in-vehicle unit 11 in which the specific second sensor 1161 is mounted via the communication unit 101. The second data request packet may be transmitted by the selecting unit 103 via the communication unit 101.

The dynamic map configurating unit 1041 configurates a dynamic map that includes a static map including a road and time-changing information on the road superimposed on the static map on the basis of the first data acquired by the data acquisition unit 1042.

In the present embodiment, the dynamic map configurating unit 1041 acquires a static map from the static map management unit 1062 when the data acquisition unit 1042 acquires the first data and configurates a dynamic map by associating the acquired static map and the first data. For example, the dynamic map configurating unit 1041 acquires a static map from the static map management unit 1062 when the data acquisition unit 1042 acquires the first data. Then, the dynamic map configurating unit 1041 disposes the first sensor 123 on the static map acquired from the static map management unit 1062 on the basis of the position of the first sensor 123 included in information on surroundings indicated by the first data. Next, the dynamic map configurating unit 1041 disposes, on the static map, a plurality of observation points included in the first data that are positions of a plurality of objects for which observation values have been acquired by the first sensor 123 on the basis of distances from the first sensor 123 to the observation points and azimuths from the first sensor 123 to the observation points included in the information on surroundings indicated by the first data. Next, the dynamic map configurating unit 1041 associates ranges from the first sensor 123 to the observation points as an "observed range" on the static map. Furthermore, for example, in a case where the information on surroundings indicated by the first data includes information concerning observation points such as types of the observation points (e.g., a traffic light, a pedestrian, a vehicle), colors of the observation points, sizes of the observation points, and speeds of the observation points, the dynamic map configurating unit 1041 reflects such information in the observation points disposed on the static map. In this way, the dynamic map configurating unit 1041 configurates the dynamic map by disposing observation points on the static map and giving information concerning the observation points on the basis of the first data.

The dynamic map configurating unit 1041 causes the configurated dynamic map to be stored in the dynamic map management unit 1063.

The dynamic map reconfigurating unit 1043 reconfigurates the dynamic map configured by the dynamic map configurating unit 1041 by filling the unobserved region by using the second data acquired by the data acquisition unit 1042.

In the present embodiment, in a case where the data acquisition unit 1042 receives second data of the in-vehicle unit 11 selected by the selecting unit 103, the dynamic map reconfigurating unit 1043 reconfigurates the dynamic map stored in the dynamic map management unit 1063. For example, the dynamic map reconfigurating unit 1043 acquires the dynamic map from the dynamic map management unit 1063 and associates the acquired dynamic map with the second data received by the data acquisition unit 1042. The process of associating the dynamic map and the second data is similar to the process of associating the static map and the first data, and therefore description thereof is omitted.

The dynamic map reconfigurating unit 1043 causes the reconfigured dynamic map to be stored in the dynamic map management unit 1063.

Distributing Unit 105

The distributing unit 105 distributes the dynamic map stored in the dynamic map management unit 1063 to the in-vehicle unit 11. More specifically, the distributing unit 105 distributes the dynamic map reconfigured by the dynamic map reconfigurating unit 1043 to at least one of the plurality of vehicles.

Operation of Whole System

Next, an outline of operation of the communication system 1 configured as above is described with reference to FIG. 11.

Figure 11:
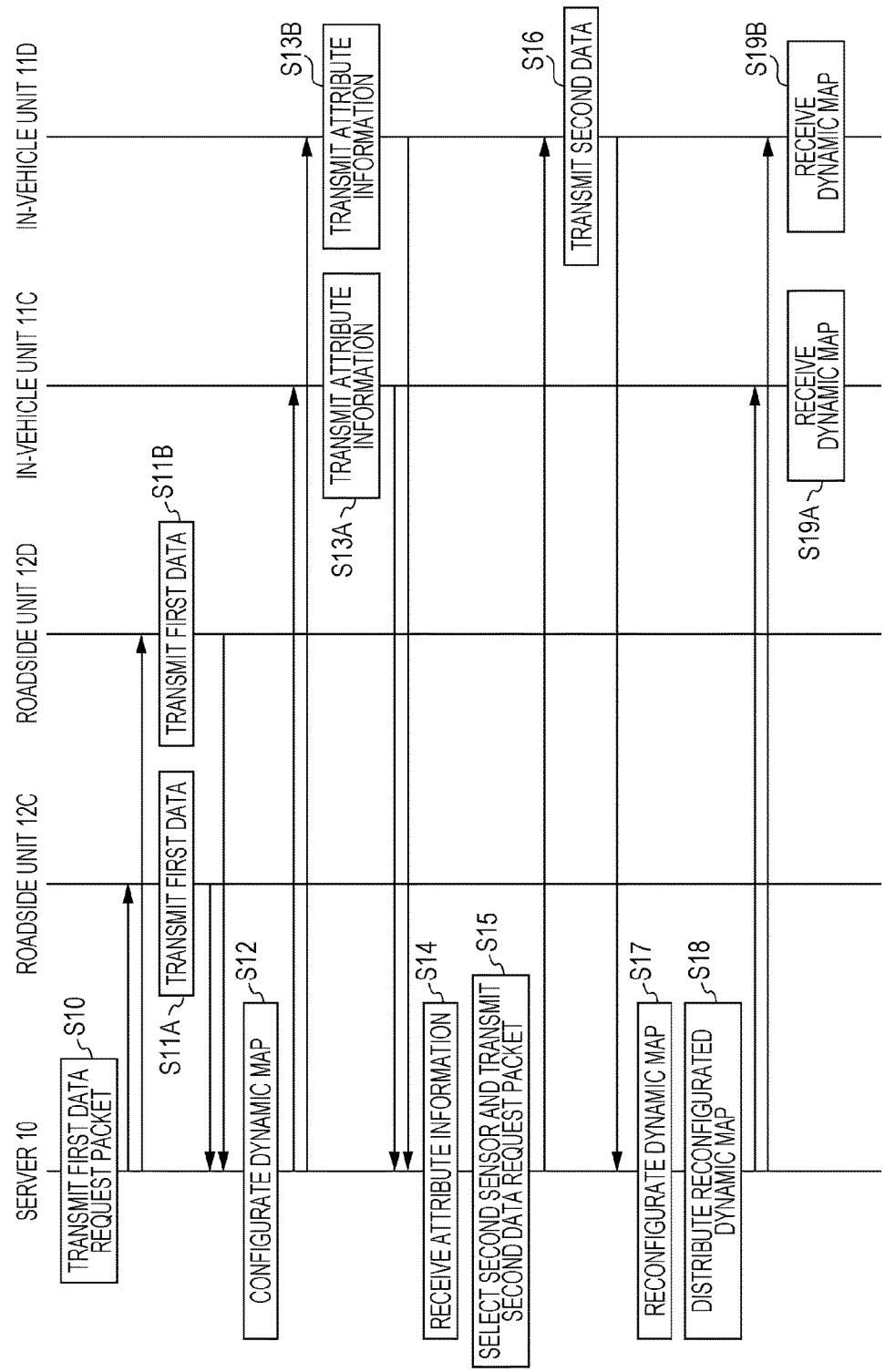
FIG. 11 is a sequence diagram illustrating an example of operation of the communication system according to Embodiment 1.

FIG. 11 is a sequence diagram illustrating an example of operation of the communication system 1 according to Embodiment 1. Operation of the communication system 1 is described by taking the situation illustrated in FIG. 9 as an example.

First, the server 10 transmits a first data request packet to a roadside unit 12C and a roadside unit 12D (not illustrated) (S10).

Next, upon receipt of the first data request packet, the roadside unit 12C acquires first data from a first sensor 123 mounted in the roadside unit 12C and then transmits the acquired first data to the server 10 (S11A). A process in Step S11B performed by the roadside unit 12D is similar to that in Step S11A, and therefore description thereof is omitted.

Next, upon receipt of the first data from the roadside unit 12C and the roadside unit 12D, the server 10 configurates a dynamic map (S12).

Next, an in-vehicle unit 11C regularly transmits attribute information to the server 10 connected, for example, via the roadside unit 12C (S13A). In the example illustrated in FIG. 11, the in-vehicle unit 11C transmits attribute information to the server 10 upon receipt of an attribute information request packet that is regularly transmitted from the server 10. However, the present embodiment is not limited to this. The in-vehicle unit 11C may regularly transmit attribute information to the server 10 voluntarily. A process in Step S13B performed by an in-vehicle unit 11D is similar to that in Step S13A, and therefore description thereof is omitted.

Next, the server 10 receives attribute information from the in-vehicle unit 11C and the in-vehicle unit 11D (S14).

Next, the server 10 selects one or more second sensors 1161 and transmits a second data request packet to the in-vehicle units 11 in which the selected second sensors 1161 are mounted (S15). In the example illustrated in FIG. 9, the server 10 selects a specific second sensor 1161 that acquires second data that can fill an unobserved region 60 on the basis of the dynamic map configured in Step S12 and the attribute information received in Step S14. Then, the server 10 transmits a second data request packet to the in-vehicle unit 11D in which the selected specific second sensor 1161 is mounted.

Next, upon receipt of the second data request packet, the in-vehicle unit 11D acquires second data from the second sensor 1161 mounted therein and then transmits the acquired second data to the server 10 (S16).

Next, the server 10 reconfigures the dynamic map configurated in Step S12 upon receipt of the second data acquired by the selected second sensor 1161 (S17).

Next, the server 10 distributes the dynamic map reconfigured in S17 to the in-vehicle unit 11C and the in-vehicle unit 11D (S18).

Next, the in-vehicle unit 11C receives the dynamic map distributed by the server 10 (S19A). Then, the in-vehicle unit 11C further acquires second data from the second sensor 1161 mounted therein. Then, the in-vehicle unit 11C reconfigurates the received dynamic map on the basis of the received dynamic map and the further acquired second data. A process in Step S19B performed by the in-vehicle unit 11D is similar to the process in Step S19A, and therefore description thereof is omitted.

Operation of Server 10

Next, operation of the server 10 according to Embodiment 1 is described with reference to FIGS. 12 and 13.

Figure 12:
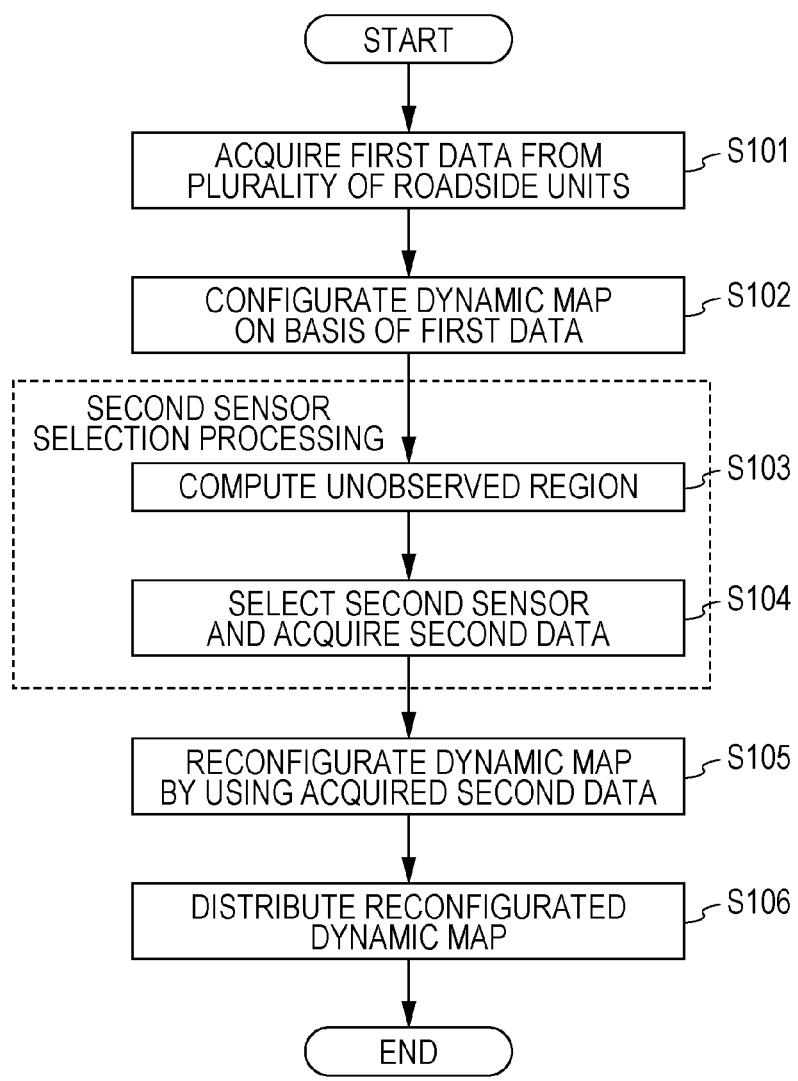
FIG. 12 is a flowchart illustrating an example of operation of the server according to Embodiment 1.

FIG. 12 is a flowchart illustrating an example of operation of the server 10 according to Embodiment 1. FIG. 13 is a flowchart illustrating an example of detailed operation of second sensor selection processing illustrated in FIG. 12.

In FIG. 12, as described above, the server 10 first acquires first data from a plurality of roadside units 12 (S101) and configurates a dynamic map on the basis of the acquired first data (S102).

Next, as the second sensor selection processing, the server 10 computes an unobserved region that is incapable of being created from the first data in the dynamic map configurated in Step S102 (S103), selects one or more second sensors 1161 that can fill the computed unobserved region, and acquires second data from the selected one or more second sensors 1161 (S104).

Then, the server 10 reconfigurates the dynamic map configurated in Step S102 by using the one or more pieces of second data acquired in Step S104 (S105) and distributes the reconfigurated dynamic map (S106).

Details of the second sensor selection processing are described below with reference to FIG. 13.

Figure 13:
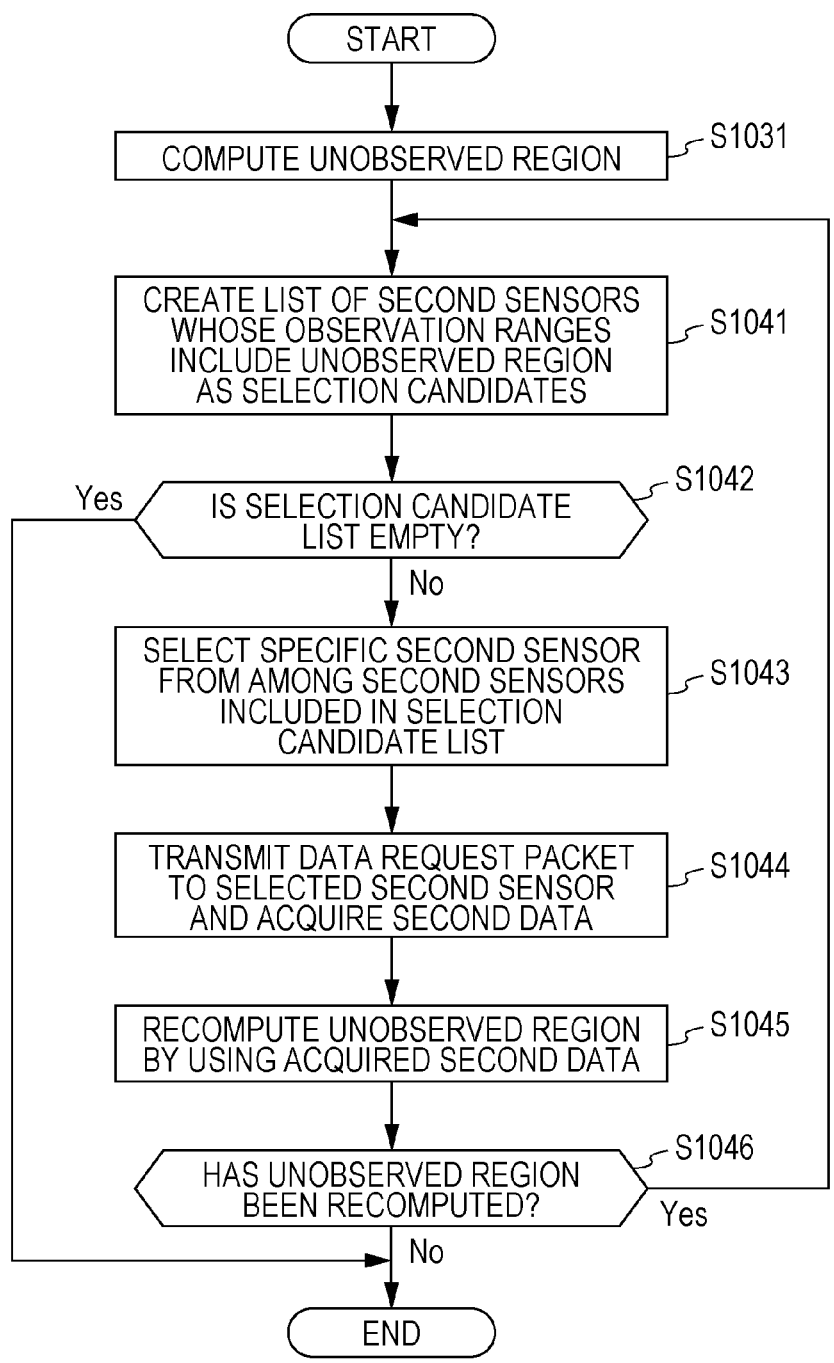
FIG. 13 is a flowchart illustrating an example of detailed operation of second sensor selection processing illustrated in FIG. 12.

In the second sensor selection processing illustrated in FIG. 13, first, the selecting unit 103 of the server 10 acquires a dynamic map from the dynamic map management unit 1063 and then computes an unobserved region from the acquired dynamic map (S1031). In this process, the selecting unit 103 computes, as the unobserved region that is incapable of being created from the first data, a range other than a range determined as an "observed range" in configuration of the dynamic map.

Next, the selecting unit 103 creates a list of one or more second sensors 1161 whose observation ranges include the unobserved region as sensor observation information selection candidates (S1041). In the present embodiment, the selecting unit 103 acquires attribute information from the attribute information management unit 1061 and finds which second sensor 1161 has an observation range including the unobserved region on the basis of information included in the attribute information such as an observation distance, a view angle, a position, and an observation direction. Then, the selecting unit 103 creates a list of one or more second sensors 1161 whose observation ranges include the unobserved region as selection candidates.

Next, the selecting unit 103 checks whether or not the created selection candidate list is empty (S1042).

In a case where the created selection candidate list is empty (Yes in S1042), the selecting unit 103 finishes the second sensor selection processing.

Meanwhile, in a case where the selection candidate list is not empty (No in S1042), the selecting unit 103 selects a specific second sensor 1161 from the selection candidate list (S1043). A specific method for selecting a specific second sensor 1161 has been described above. Specifically, for example, the selecting unit 103 may select, as the specific second sensor 1161, a second sensor 1161 that is largest in overlapping range between an observation region and the unobserved region from among the one or more second sensors 1161 included in the selection candidate list. Alternatively, the selecting unit 103 may select the specific second sensor 1161 on the basis of priorities given to respective types of the one or more second sensors 1161 included in the selection candidate list. In a case where the selection candidate list includes a plurality of second sensors 1161, the selecting unit 103 need just classify the second sensors 1161 included in the selection candidate list into groups depending on the types of the second sensors 1161 and select a specific second sensor 1161 from a group given a high priority. In a case where a plurality of second sensors 1161 are included in the group given a high priority, the selecting unit 103 need just select a specific second sensor 1161 by a similar method to the selection method 1, i.e., select a second sensor 1161 that is largest in overlapping range between an observation region thereof and the unobserved region. Alternatively, the selecting unit 103 may select the specific second sensor 1161 on the basis of data size information of second data acquired by the one or more second sensors 1161 included in the selection candidate list.

Next, the selecting unit 103 transmits a second data request packet to the in-vehicle unit 11 in which the specific second sensor 1161 selected in Step S1043 is mounted and acquires second data from the specific second sensor 1161 of the in-vehicle unit 11 (S1044). Step S1044 may be executed by the data acquisition unit 1042.

Next, the selecting unit 103 recalculates the unobserved region calculated in Step S1031 by using the acquired second data (S1045). Specifically, in the recalculation process, the selecting unit 103 determines, as an unobserved region, a region obtained by excluding an observation range of the second sensor 1161 included in the acquired second data from the unobserved region calculated in Step S1031.

Next, in a case where there is an unobserved region in Step S1045, i.e., in a case where the selecting unit 103 succeeded in recalculating the unobserved region (Yes in Step S1046), the selecting unit 103 returns to the process in Step S1041 and repeats the processing.

Meanwhile, in a case where the selecting unit 103 failed to recalculate the unobserved region in Step S1045 (No in Step S1046), the selecting unit 103 finishes the second sensor selection processing.

Effects Etc.

According to the present embodiment, it is thus possible to provide a communication method and a server that make it possible to prevent shortage of a network band by efficiently collecting data necessary for creation of a dynamic map.

More specifically, the server 10 according to the present embodiment selects a specific second sensor 1161 that acquires second data that can fill an unobserved region on the basis of attribute information of second data in order to configurate a dynamic map that has no unobserved region or has an unobserved region that is as small as possible. This makes it possible to perform communication with the in-vehicle unit 11 in which the specific second sensor 1161 that acquires second data that can fill an unobserved region is mounted while avoiding communication with the in-vehicle unit 11 in which the second sensor 1161 that acquires second data that cannot fill the unobserved region is mounted. It is thus possible for the server 10 to create a dynamic map that can cover as wide a range as possible and to achieve stable communication while preventing shortage of a network resource.

Embodiment 2

Differences of Embodiment 2 from Embodiment 1 are described below.

Configuration of Server 20

Figure 14:
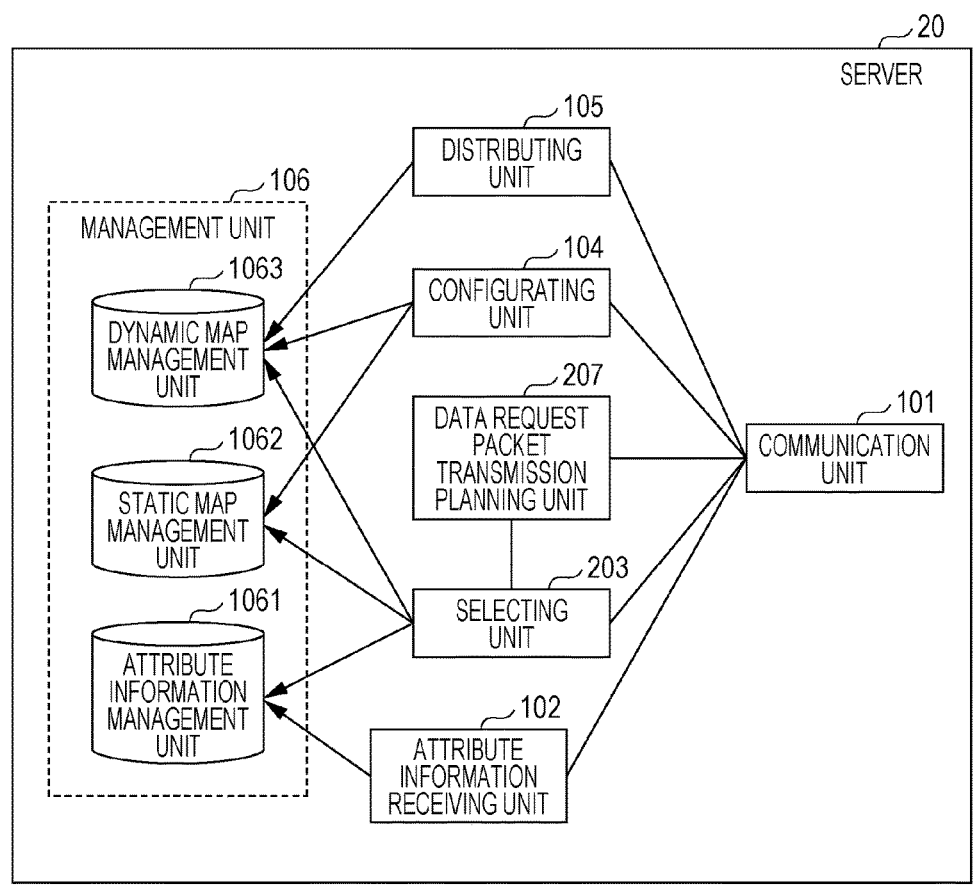
FIG. 14 is a diagram illustrating an example of a configuration of a server according to Embodiment 2.

FIG. 14 is a diagram illustrating an example of a configuration of a server 20 according to Embodiment 2. In FIG. 14, elements that are similar to those in FIG. 7 are given identical reference signs, and detailed description thereof is omitted.

The server 20 illustrated in FIG. 14 further includes a data request packet transmission planning unit 207 in addition to the configuration of the server 10 illustrated in FIG. 7 and is different in configuration of a selecting unit 203.

Data Request Packet Transmission Planning Unit 207

The data request packet transmission planning unit 207 transmits a second data request packet including an instruction to transmit second data acquired by a specific second sensor 1161 selected by the selecting unit 203 to an in-vehicle unit 11 in which the specific second sensor 1161 is mounted. In a case where a reception rate of the second data received by a data acquisition unit 1042 of the server 20 is larger than a threshold value, the data request packet transmission planning unit 207 transmits a second data request packet including an instruction to transmit second data after a predetermined period to the in-vehicle unit 11. The server 20 acquires second data acquired by the specific second sensor 1161 by receiving the second data acquired by the specific second sensor 1161 from the vehicle to which the data request packet transmission planning unit 207 has transmitted the second data request packet including the instruction.

In the present embodiment, the data request packet transmission planning unit 207 transmits a second data request packet to the in-vehicle unit 11 via a communication unit 101 in a planned manner. More specifically, the data request packet transmission planning unit 207 receives, from the selecting unit 203, a second data request packet to be transmitted to the in-vehicle unit 11. Then, the data request packet transmission planning unit 207 acquires information of a roadside unit 12 located on a transmission path of the second data request packet, for example, from an IP address described in the second data request packet or from attribute information including the in-vehicle unit 11 to which the second data request packet is to be transmitted. In a case where a reception rate of second data received via the roadside unit 12 is larger than a threshold value, the data request packet transmission planning unit 207 may delay transmission of the second data request packet by a predetermined period or may cause an instruction to transmit second data after a predetermined period to be included in the second data request packet to be transmitted to the in-vehicle unit 11. The predetermined period may be a period taken for the server 20 to receive second data corresponding to another second data request packet or may be any period. The threshold value is, for example, 90% of a network band that can be used effectively but may be approximately 70%.

Selecting Unit 203

The selecting unit 203 includes the functions of the selecting unit 103 according to Embodiment 1 and selects one or more specific second sensors 1161 from which second data is to be acquired by performing predetermined processing. In the present embodiment, not the data acquisition unit 1042 but the selecting unit 203 transmits a second data request packet via the data request packet transmission planning unit 207. The data acquisition unit 1042 may transmit a second data request packet via the data request packet transmission planning unit 207 as in Embodiment 1.

Effects Etc.

According to the present embodiment, it is thus possible to provide a communication method and a server that make it possible to prevent shortage of a network band by efficiently collecting data necessary for creation of a dynamic map.

Furthermore, according to the present embodiment, the server 20 can avoid excessive communication that occurs in an unexpected fashion by acquiring second data that can fill an unobserved region in a planned manner in order to configurate a dynamic map that has no unobserved region or has an unobserved region that is as small as possible.

In this way, the server 20 can achieve stable communication while preventing shortage of a network resource and acquire second data that can fill the unobserved region with certainty.

Embodiment 3

Differences of Embodiment 3 from Embodiment 1 are mainly described below.

Configuration of In-Vehicle Unit 31

Figure 15:
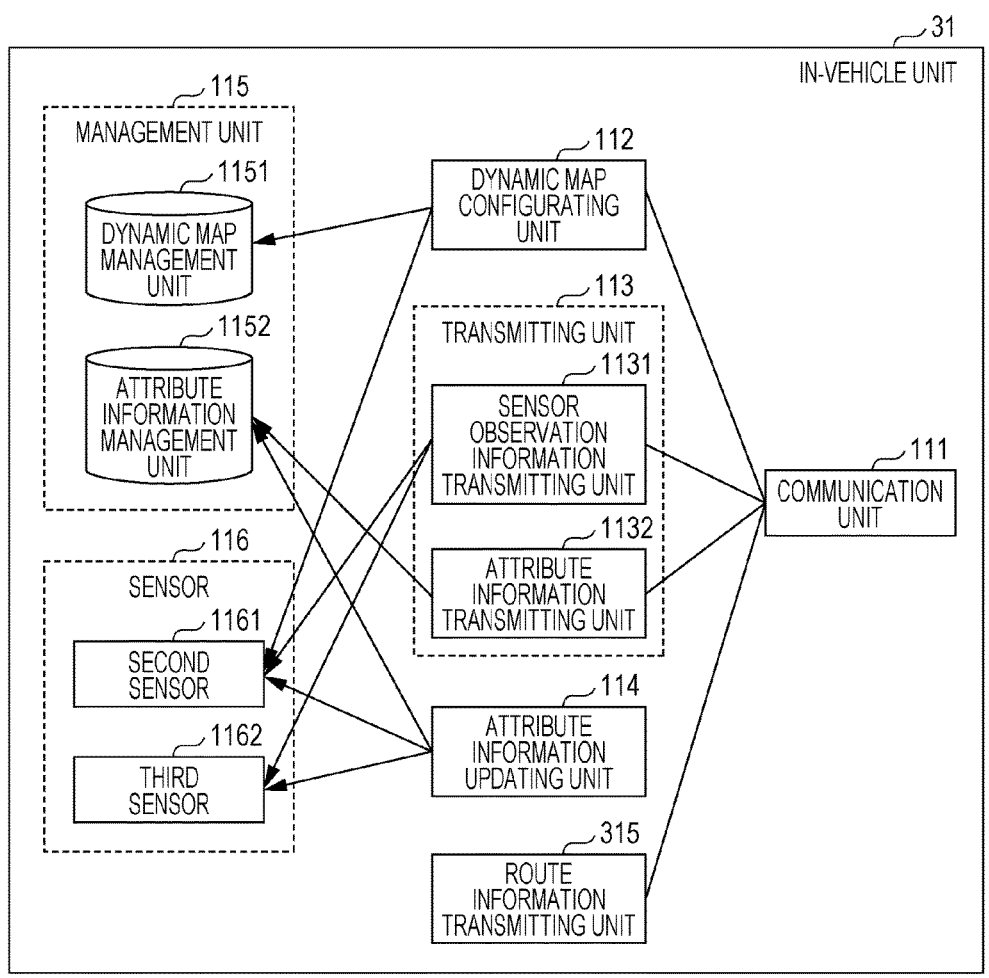
FIG. 15 is a diagram illustrating an example of a functional configuration of an in-vehicle unit according to Embodiment 3.

FIG. 15 is a diagram illustrating an example of a functional configuration of an in-vehicle unit 31 according to Embodiment 3. In FIG. 15, elements that are similar to those in FIG. 4 are given identical reference signs, and detailed description thereof is omitted. The in-vehicle unit 31 illustrated in FIG. 15 further includes a route information transmitting unit 315 in addition to the configuration of the in-vehicle unit 11 illustrated in FIG. 4.

Route Information Transmitting Unit 315

The route information transmitting unit 315 receives, from a server 30 via a communication unit 101, a vehicle information and other information request packet requesting vehicle information that is information concerning a vehicle in which the in-vehicle unit 31 is mounted such as the position, speed, and direction of the vehicle and route information of the vehicle. Then, the route information transmitting unit 315 acquires the route information of the vehicle and the vehicle information acquired by a third sensor 1162 and then transmits the route information and the vehicle information to the server 30 via the communication unit 101. The route information can be, for example, acquired from a navigation system that has route information on a route to a destination of the vehicle entered by a person on the vehicle.

Configuration of Server 30

Figure 16:
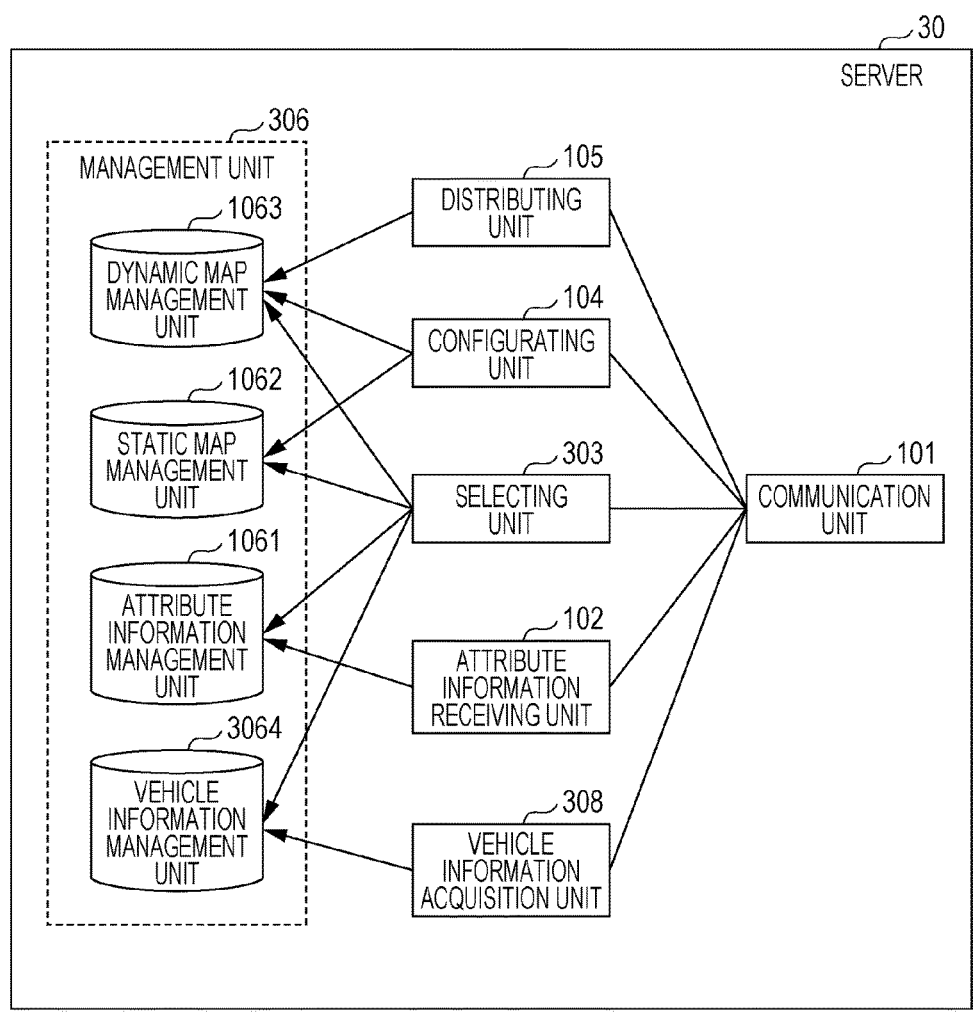
FIG. 16 is a diagram illustrating an example of a functional configuration of a server according to Embodiment 3.

FIG. 16 is a diagram illustrating an example of a functional configuration of the server 30 according to Embodiment 3. In FIG. 16, elements that are similar to those in FIG. 7 are given identical reference signs, and detailed description thereof is omitted. The server 30 illustrated in FIG. 16 further includes a vehicle information management unit 3064 and a vehicle information acquisition unit 308 in addition to the configuration of the server 10 illustrated in FIG. 7 and is different in configuration of a selecting unit 303.

Vehicle Information Acquisition Unit 308

The vehicle information acquisition unit 308 transmits, to the in-vehicle unit 31, a vehicle information and other information request packet requesting vehicle information including the position of a vehicle and route information and positional information of the vehicle. Then, the vehicle information acquisition unit 308 acquires the vehicle information including the position of the vehicle and the route information of the vehicle from the in-vehicle unit 31 and then causes the acquired vehicle information including the position of the vehicle and the route information of the vehicle to be stored in the vehicle information management unit 3064 in association with information for identifying the in-vehicle unit 31 such as a MAC address of the in-vehicle unit 31.

Vehicle Information Management Unit 3064

The vehicle information management unit 3064 is, for example, a memory such as a RAM or a storage such as a hard disc drive or a solid state drive. The vehicle information management unit 3064 stores therein the vehicle information including the position of the vehicle and the route information of the vehicle that are acquired from the in-vehicle unit 31 of the vehicle in association with information for identifying the vehicle such as a MAC address acquired by the vehicle information acquisition unit 308.

Selecting Unit 303

Figure 17:
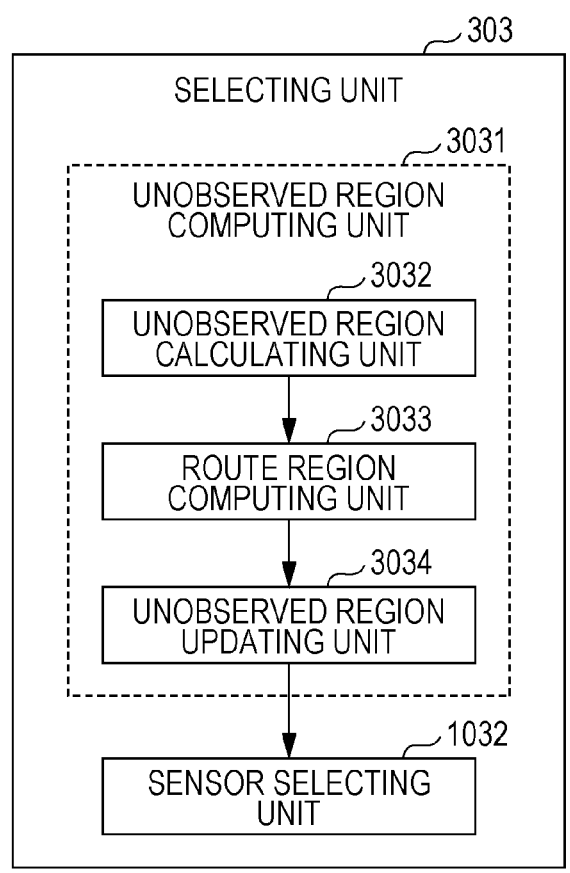
FIG. 17 is a diagram illustrating an example of a detailed configuration of a selecting unit illustrated in FIG. 16.

FIG. 17 is a diagram illustrating an example of a detailed configuration of the selecting unit 303 illustrated in FIG. 16. In FIG. 17, elements that are similar to those in FIG. 8 are given identical reference signs, and detailed description thereof is omitted. The selecting unit 303 illustrated in FIG. 17 is different from the selecting unit 103 illustrated in FIG. 8 in the configuration of an unobserved region computing unit 3031. Specifically, the unobserved region computing unit 3031 includes an unobserved region calculating unit 3032, a route region computing unit 3033, and an unobserved region updating unit 3034.

The unobserved region calculating unit 3032 computes an unobserved region that is included in a region indicated by a dynamic map configurated by a configurating unit 104 and that is incapable of being created from first data received by the communication unit 101.

The route region computing unit 3033 computes a route region that is a region including routes indicated by all pieces of route information of a plurality of in-vehicle units 31 and is a region within a certain distance from the routes on the basis of the route information and positional information of the plurality of in-vehicle units 31.

The unobserved region updating unit 3034 updates, as an unobserved region, a region that overlaps the route region computed by the route region computing unit 3033 in the unobserved region computed by the unobserved region calculating unit 3032.

Operation of Server 30

Next, operation of the server 30 according to Embodiment 3 is described. Operation of the server 30 according to Embodiment 3 is identical to that described with reference to FIG. 12 except for the process in Step S103. The process in Step S103 in Embodiment 3 is described below.

Figure 18:
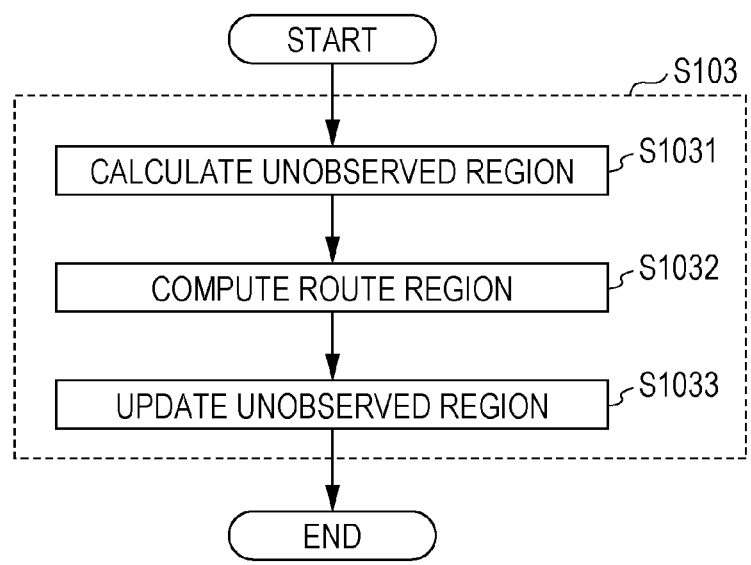
FIG. 18 is a flowchart illustrating an example of a process in Step S103 according to Embodiment 3.

FIG. 18 is a flowchart illustrating an example of the process in Step S103 in Embodiment 3.

In Step S103, first, the unobserved region calculating unit 3032 calculates an unobserved region that is incapable of being created from first data in the dynamic map configurated in Step S102 illustrated in FIG. 12 (S1031).

Next, the route region computing unit 3033 acquires route information of each vehicle from the vehicle information management unit 3064 and calculates a route region that is a region including routes indicated by all of the pieces of route information of the respective vehicles and is a region within a certain distance from the routes (S1032).

Finally, the unobserved region updating unit 3034 updates, as an unobserved region, a region that overlaps the route region computed by the route region computing unit 3033 in the unobserved region computed by the unobserved region calculating unit 3032 (S1033). In other words, the unobserved region updating unit 3034 updates, as an unobserved region, a region obtained by deleting a region that need not be filled in the unobserved region computed in Step S1031 by referring to the route information and the unobserved region. That is, the selecting unit 303 regards, as an updated unobserved region, a region included within a certain range from the route information in the unobserved region computed in Step S1031. A region that is not included within the certain range from the route information is an unnecessary region that is not needed by any vehicle as dynamic information and is therefore not included in the updated unobserved region.

Effects Etc.

According to the present embodiment, it is thus possible to provide a communication method and a server that make it possible to prevent shortage of a network band by efficiently collecting data necessary for creation of a dynamic map.

More specifically, even in a case where a dynamic map includes an unobserved region, the server 30 according to the present embodiment determines that there is no in-vehicle unit 31 that uses dynamic information in an unnecessary region within the unobserved region by computation based on route information of vehicles and the like. In this way, the server 30 can avoid acquisition of second data that fills the unnecessary region. This makes it possible to prevent shortage of a network resource better, achieve more stable communication, and acquire second data with certainty.

Other Modifications

A communication method and a server according to one or more aspects of the present disclosure have been described above, but the present disclosure is not limited to these embodiments. Various modifications of the present embodiment which a person skilled in the art can think of and combinations of constituent elements in different embodiments are also encompassed within one or more aspects of the present disclosure without departing from the scope of the present disclosure. For example, the following cases are also encompassed within the present disclosure.

(1) Each of the devices is specifically a computer system constituted by a microprocessor, a ROM, a RAM, a hard disc unit, a display unit, a keyboard, a mouse, and the like. A computer program is stored in the RAM or the hard disc unit. The microprocessor operates in accordance with the computer program. Thus, each of the devices accomplishes a function thereof. The computer program is a combination of a plurality of command codes indicative of commands given to the computer in order to accomplish a predetermined function.

(2) All or a part of constituent elements that constitute each of the devices may be a single system large scale integration (LSI). The system LSI is a super-multifunctional LSI including a plurality of constituent parts integrated onto one chip and is specifically a computer system including a microprocessor, a ROM, a RAM, and the like. A computer program is stored in the RAM. The microprocessor operates in accordance with the computer program, and thereby the system LSI accomplishes a function thereof.

(3) Part of or all of the constituent elements that constitute each of the devices may be provided as an IC card detachably attached to the device or a stand-alone module. The IC card or the module is a computer system including a microprocessor, a ROM, a RAM, and the like. The IC card or the module may include the aforementioned super-multifunctional LSI. The microprocessor operates in accordance with a computer program, and thereby the IC card or the module accomplishes a function thereof. The IC card or the module may have tamper resistance.

(4) The present disclosure may be the methods described above. The present disclosure may be a computer program that realizes these methods by a computer or may be a digital signal representing the computer program.

The present disclosure may be a computer-readable recording medium, such as a flexible disc, a hard disc, a CD-ROM, an MO, a DVD, a DVD-ROM, a DVD-RAM, a Blu-ray (Registered trademark) disc (BD), or a semiconductor memory, in which the computer program or the digital signal is stored in a computer-readable manner or may be the digital signal recorded in these recording media.

The present disclosure may be the computer program or the digital signal transmitted over an electrical communication line, a wired or wireless communication line, a network represented by the Internet, data broadcasting, or the like.

The present disclosure may be a computer system including a microprocessor and a memory, the memory recording thereon the computer program, and the microprocessor operating in accordance with the computer program.

The present disclosure may be implemented by another independent computer system by transferring the program or the digital signal recorded on the aforementioned recording medium or by transferring the program or the digital signal over the aforementioned network or the like.

(5) The above embodiments may be combined.

(6) In the above embodiments, for simplification of description, observation regions of the first sensor and the second sensor are two-dimensional regions but may be three-dimensional regions.

The present disclosure can be used for a communication method and a server, especially for a communication method and a server used to configure a dynamic map for offering safe driving assistance and realizing automated driving.

What is claimed is:

1. A method used in a server, comprising:
receiving, from a roadside unit placed on a side of a road, first data that is acquired by a first sensor mounted in the roadside unit and that is indicative of information on surroundings of the roadside unit;
configurating a dynamic map by superimposing time-changing information on the road onto a static map including the road on a basis of the received first data; computing a first region that is incapable of being observed by the first sensor, the first region being included in a region indicated by the dynamic map;
receiving a plurality of attribute information items from a respective plurality of vehicles running on the road, the plurality of attribute information items being related to a respective plurality of second sensors mounted in the respective plurality of vehicles; selecting a specific second sensor from among the plurality of second sensors on a basis of the plurality of attribute information items and the first region;
receiving specific second data acquired by the specific second sensor among a plurality of pieces of second data acquired by the plurality of second sensors, the plurality of pieces of second data being indicative of information on surroundings of the respective plurality of vehicles;
reconfigurating the dynamic map by filling the first region by using the received specific second data; and distributing the reconfigurated dynamic map to at least one of the plurality of vehicles.

2. The method according to claim 1, wherein
each of the plurality of attribute information items includes view angle information indicative of a view angle of a corresponding one of the plurality of second sensors, observation distance information indicative of a distance that is observable by the corresponding one of the plurality of second sensors, positional information indicative of a position of the corresponding one of the plurality of second sensors, and a direction information indicative of a direction of the corresponding one of the plurality of second sensors; and
the selecting of the specific second sensor includes:
computing second regions that are observable by the plurality of second sensors on a basis of the view angle information, the observation distance information, the positional information, and the direction information, the second regions being included in the region indicated by the dynamic map; and
selecting, as the specific second sensor, a second sensor that is largest in an overlapping range between the second region and the first region from among the plurality of second sensors.

3. The method according to claim 1, wherein
each of the plurality of attribute information items includes type information indicative of a type of a corresponding one of the plurality of second sensors; and
the selecting of the specific second sensor includes:
determining priorities of the respective plurality of second sensors on a basis of the type information;
selecting two or more second sensors that have an observation range overlapping the first region from among the plurality of second sensors; and
selecting, as the specific second sensor, a second sensor given a highest priority from among the selected two or more second sensors.

4. The method according to claim 1, wherein
each of the plurality of attribute information items includes data size information indicative of a size of a corresponding one of the plurality of pieces of second data; and
the selecting of the specific second sensor includes:
selecting two or more second sensors that have an observation range overlapping the first region from among the plurality of second sensors; and
selecting, as the specific second sensor, a second sensor that is smallest in data size per unit region indicated by the data size information from among the selected two or more second sensors.

5. The method according to claim 1, wherein
the receiving of the specific second data includes:
transmitting a request for transmission of the specific second data to a specific vehicle in which the specific second sensor is mounted; and
receiving the specific second data from the specific vehicle; and
in the transmitting, in a case where a reception rate at which the server receives the specific second data is larger than a threshold value, the request for transmission includes a request to transmit the specific second data after a predetermined period.

6. The method according to claim 1, wherein
the computing of the first region includes:
computing a third region that is a region including routes indicated by all pieces of route information of the plurality of vehicles and is a region within a certain distance from the routes on a basis of the route information and positional information of the plurality of vehicles; and
updating, as a new first region, a region that overlaps the third region in the first region.

7. A server comprising:
one or more memories; and
circuitry that, in operation, performs operations including:
receiving, from a roadside unit placed on a side of a road, first data that is acquired by a first sensor mounted in the roadside unit and that is indicative of information on surroundings of the roadside unit;
configurating a dynamic map by superimposing time-changing information on the road onto a static map including the road on a basis of the received first data; computing a first region that is incapable of being observed by the first sensor, the first region being included in a region indicated by the dynamic map;
receiving a plurality of attribute information items from a respective plurality of vehicles running on the road, the plurality of attribute information items being related to a respective plurality of second sensors mounted in the respective plurality of vehicles; selecting a specific second sensor from among the plurality of second sensors on a basis of the plurality of attribute information items and the first region;
receiving specific second data acquired by the specific second sensor reconfigurating the dynamic map by filling the first region by using the received specific second data; and
distributing the reconfigurated dynamic map to at least one of the plurality of vehicles.

* * * * *